Nov. 17, 1936.　　　　H. O. FUCHS　　　2,061,068
SHOCK ABSORBER
Filed Jan. 15, 1934
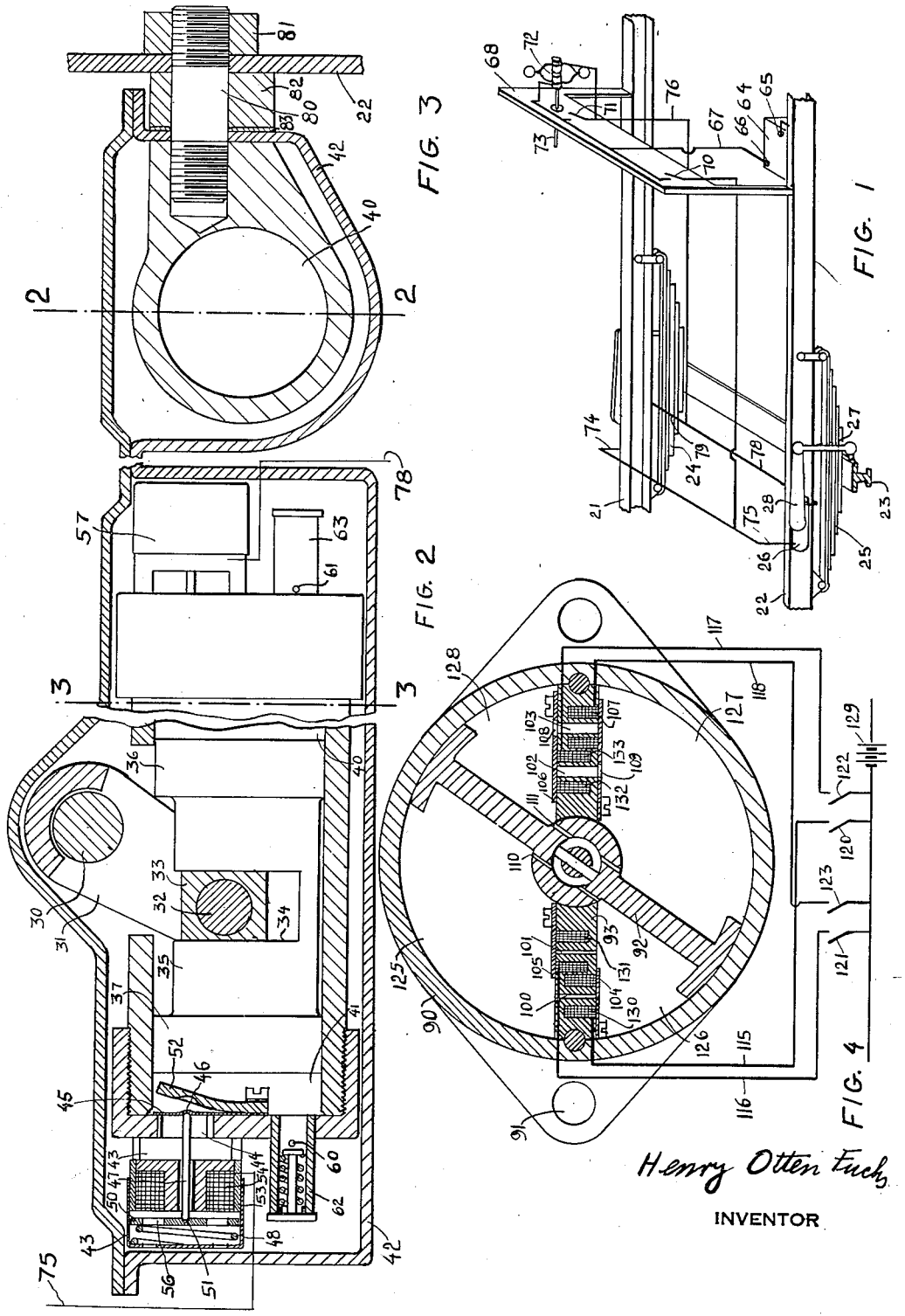
Henry Otten Fuchs
INVENTOR Patented Nov. 17, 1936

2,061,068

UNITED STATES PATENT OFFICE 2,061,068

SHOCK ABSORBER

Henry Otten Fuchs, Dayton, Ohio

Application January 15, 1934, Serial No. 706,636
In Germany January 14, 1933

13 Claims. (Cl. 188—87)

(Granted under the provisions of Sec. 14, act of
Mar. 2, 1927, 357 O. G. 5)

This invention relates to valves for shock absorbers particularly adapted to control the movement of two relatively movable members, for instance, the frame and axle of a vehicle.

It is among the objects of the present invention to provide a means to govern the action of hydraulic shock absorbers by a flow of electric current, said flow being established either at will or automatically.

It is further among the objects of the present invention to avoid the use of packings in connection with the governing, controlling or regulating of hydraulic shock absorbers.

It is further among the objects of the present invention to provide a valve governing the flow of fluids and capable of being held in the open or closed position by an electric current of less intensity than would be needed to open or close the valve.

It is further among the objects of the present invention to provide a means to govern, control or regulate the action of a hydraulic shock absorber without providing special orifices for this controlling or governing.

Further objects and advantages of the present invention will be apparent from the following description, reference being had to the accompanying drawing, where two preferred forms of embodiment of the present invention are clearly shown.

In the drawing:

Fig. 1 is a fragmentary view of the front of a vehicle chassis with shock absorbers embodying the present invention applied thereto.

Fig. 2 is a view of a shock absorber embodying the present invention partly in section along the line 2—2 of Fig. 3, partly in view, the outer case being drawn as cut open.

Fig. 3 is a sectional view taken along the line 3—3 of Fig. 2.

Fig. 4 is a sectional view of another type of shock absorber embodying this invention.

Referring to the drawing, Fig. 1 shows the two side members 21 and 22 of a vehicle frame, to which is attached the axle 23 by the springs 24 and 25. On each side rail is mounted a shock absorber 26, one of which is shown in view, the other being partly hidden from view by the side rail 21. The shock absorbers 26 are forced to function by means of the axle 23 through links 27, connected to arms 28.

Fig. 1 shows further electric connections fitted to govern and control the action of the shock absorbers, which will be explained later.

In Fig. 2, the numeral 30 designates the shaft which is rigidly connected to the arm 28 mentioned before. Shaft 30 is connected rigidly with arm 31, which carries a crank 32, on which is mounted a sliding member 33. This member 33 fits into a slot 34 provided in the central connecting portion 35 which connects the two pistons 36 and 37. In this manner, the relative movement between axle 23 and frame member 22 or 21 is transmitted to the pistons 36 and 37.

The pistons 36 and 37 move in cylinders 40 and 41. These cylinders are filled with liquid and also completely surrounded by the liquid contained in the reservoir formed by the outer case 42 of the shock absorber. Liquid is admitted from the reservoir 42 to cylinder 41 through a duct 43, and the orifice 44, opening the valve flap 45 on the suction stroke of the piston. The valve flap 45 is provided with a small depression 46, in which is held a needle 47 by the pressure of a spring 48 acting on plate 50 which in turn is provided with a recess 51 holding the other end of the needle 47. The force exerted by the spring 48 is weaker than the force exerted by the valve flap 45.

When the valve flap opens under the action of the liquid, the plate 50 follows the movement of the flap 45 and the needle 47 under the action of the spring 48, until the movement comes to a stop, flap 45 bearing against plate 52, and plate 50 bearing against the anchor 53 of an electromagnet formed by said anchor 53 and a coil 54. The spring 48 is held by a cover 43, fastened to the anchor 53. The plate 50 is provided with holes 56 to allow the passage of fluid when the plate moves.

The coil 54 can be dead or under current; the electrical connections are formed in a manner which will be explained later. When the coil is dead, the mechanism just described acts as an ordinary intake valve. When current flows through the coil, the plate 50 is held to the anchor 53 with a greater force than that exerted by the valve flap 45 and in this manner the valve is held open. This action can always be obtained by a sufficiently strong magnet, but in order to be able to use as small a magnet and as feeble a current as possible, I have shaped the plate 52 in such a manner that it protects the valve flap from the impact of the liquid streaming out of the cylinder 41 and I have arranged the mechanism in such a way that the magnet need not attract the plate 50 but only hold it after it has been brought into contact with the anchor by the action of the flowing liquid itself. Cylinder 40 is provided in exactly the same manner with a mechanism consisting of a valve and an electromagnet, shown in view and designated by the numeral 57.

When coil 54 and the coil in the mechanism 57 are dead, the shock absorber acts in the manner well known by all those skilled in this art, liquid being forced through the orifices 60 and 61 which are located in the relief valve assemblies 62 and 63 respectively, and, if the pressure in the cylinder becomes too great, through the relief valves 62 and 63.

The liquid in one of the two cylinders is forced out when the spring 25 is compressed; when the spring opens up, the liquid is forced out of the other cylinder.

When the coil 54 is under current and the valve flap 45 is held open, the fluid in cylinder 41 can move out with less resistance than if it was forced to pass through orifice 60 and valve 62 exclusively. In this way, the damping action of cylinder 41 can be diminished. In the same way the damping action of cylinder 40 can be diminished when current flows through the coil contained in the mechanism 57.

The current which in the described manner is used to govern the action of the shock absorber is furnished by the battery 64. This battery furnishes also the current for different other devices on the automobile, but here only the connections necessary for the governing of the front shock absorbers will be described, (see Fig. 1).

One pole 65 of the battery 64 is connected to the iron mass of the car, the other pole 66 is connected to a wire 67 leading to the instrument panel 68. On this panel 68 are provided two hand operated switches designated with the numerals 70 and 71 respectively, and a switch 72 operated centrifugally by the drive 73 which is also connected to the speedometer. This centrifugally operated switch is built in any one of the different manners well known to all those skilled in this art. The wire 67 is connected to one side of each of these three switches. The other side of switch 70 is connected with the ends 74 and 75 of the coils governing the action of the cylinders damping the rebound of springs 24 and 25 respectively; the other ends of these coils being connected to the iron mass of the car. By closing switch 70, the driver can therefore, diminish the damping of the rebound of the front springs.

The switches 71 and 72 are connected in parallel so that the closing of either one, closes the circuit consisting of the battery 64, wire 67, switch 71 or 72, wire 76, wires 78 and 79, coils and the iron mass of the car. These coils contained in this circuit govern the damping of the compression of the front springs. By closing switch 71, the damping of the compression of the springs can be reduced. This is always desirable at higher car speeds and, therefore, the automatic switch 72 is provided.

Fig. 3 shows the manner in which the shock absorber shown in Fig. 2 is fastened to the car, numeral 80 designating the bolt which connects cylinder 40 and cover 42 to the side rail 22 by means of nut 81, spacer 82 and packing 83.

Fig. 4 shows a section through a shock absorber of a different type embodying also this invention. It shows the housing 90 with holes 91 provided for fastening it to the frame of an automobile. In this housing, four compartments for liquid are formed by the partition 93 made preferably of steel and the rotatable piston 92; the compartments are designated by the numerals 125, 126, 127, 128 respectively. By rotation of piston 92, liquid is forced from compartment 125 into compartment 126 and from compartment 127 into compartment 128 or vice versa.

To allow this exchange of liquid between the compartment, orifices 110 and 111 are provided in the piston and orifices 100, 101, 102 and 103 in the partition. The orifices in the partition are provided with valve flaps 104, 105, 106 and 107 which may be of spring steel and can be held on their seats by the magnets which are formed when electric current flows through the coils 130, 131, 132 or 133 respectively. Two orifices are provided in each half of the partition, one for the flow of liquid in each direction, the other being held closed for this direction by the action of the valve flap. The orifices 100 and 101 are of the same size, the orifices 102 and 103 of greater size.

Holes 108 and 109 are provided in the flaps 106 and 107 to allow the passage of liquid through the orifices which are not controlled by these flaps, but over which they extend for reasons of space economy. The coils 130, 131, 132, 133 are connected to the iron mass of the car and through wires 115, 116, 117, 118 and switches 120, 121, 122, 123 respectively, to the battery 129.

When all the switches are closed, all valve flaps are held on their seat by the magnet and the exchange of liquid can only go on through the orifices 110 and 111. This gives maximum damping of the shock absorber in both directions. If switch 120 is opened, orifice 100 is available for the exchange of liquid. It will be remembered that this orifice is only available for the exchange of liquid in one direction, due to the action of the valve flap 104. The resistance of the shock absorber in one direction is, therefore, diminished. If switch 120 is closed and switch 122 is opened, the resistance for this direction will be further diminished because the greater orifice 102 is then available for the exchange of fluid in this direction. Finally, if both switches 120 and 122 are opened, the total resistance in this direction will be a minimum.

The same four stages of resistance can be obtained for the opposite direction by similar operation of the switches 121 and 123, respectively.

It will be seen from this description, that governing mechanism for the action of the shock absorber is relatively small, due to the fact that the magnets need not move any parts but only hold or release them, and the moving parts of the mechanism are entirely enclosed within the shock absorber itself, only electrical connections between inside and outside being necessary.

While this present invention is particularly adapted to shock absorbers controlling the relative movements of frame and wheels of vehicles, it is to be understood that it also can be applied to other damping devices and also to control the flow of fluids for other purposes.

While the forms of embodiment of the present invention as herein disclosed constitute preferred forms, it is to be understood that other forms might be adopted all coming under the scope of the claims which follow.

What is claimed is as follows:

1. A shock absorber comprising, in combination, a housing providing two compartments therein and containing fluid; a piston movable in one of said compartments; a one-way valve between both compartments; a duct permitting flow between both compartments when said one-way valve is closed and an electromagnet for rendering said valve inoperative.

2. A shock absorber comprising, in combination, a housing providing two compartments therein and containing fluid; a piston movable in one of said compartments; a one-way valve between both compartments; a duct permitting flow between both compartments when said one-way valve is closed and an electromagnet in the housing for rendering said valve inoperative.

3. A shock absorber providing, in combination, a sealed housing providing two compartments therein and containing fluid; a double acting piston in one of said compartments, said piston defining two compression chambers therein; a plurality of one-way valves between the compression chambers and the other compartment; ducts permitting restricted fluid flow between the compression chambers and the other compartment; and a plurality of electromagnets for rendering the valves inoperative.

4. A shock absorber comprising, in combination, a sealed housing providing two compartments therein and containing fluid; a piston movable in one of said compartments; a one-way valve between both compartments; a duct establishing restricted communication between both compartments; an electrical means for rendering the valve inoperative.

5. A shock absorber comprising, in combination, a sealed housing providing two compartments therein and containing fluid; a piston movable in one of said compartments; a one-way valve tending to intercept fluid flow from said one compartment to the other compartment; a duct establishing restricted communication between both compartments and electrical means for holding the valve open.

6. A shock absorber comprising, in combination, a sealed housing providing two compartments therein and containing fluid; a piston movable in one of said compartments; a one-way valve tending to intercept fluid flow from said one compartment to the other compartment; electrical means for holding the valve open; and means diverting the fluid flow to prevent impact of the same upon the valve.

7. In a shock absorber, the combination of a housing providing compartments therein and containing fluid, said compartments communicating with each other through an orifice; a piston movable in one of said compartments; a resilient member tending to close the orifice; and an electromagnet for preventing movement of the member.

8. In a shock absorber, the combination of a housing providing compartments therein and containing fluid, said compartments communicating with each other through an orifice; a piston movable in one of said compartments; a resilient member tending to close the orifice; and an electromagnet for holding the member in open position.

9. In a shock absorber, the combination of a sealed housing providing compartments therein and containing fluid; a double acting piston movable in one of said compartments and defining two compression chambers therein; two one-way valves providing communication between the compression chambers and the other compartment, one of said valves permitting fluid flow into said other compartment and the other valve permitting fluid flow from said other compartment; ducts providing permanent communication between both compression chambers and said other compartment; and electrical means for rendering the valves inoperative.

10. In a shock absorber the combination of a sealed housing providing compartments therein and containing fluid; a piston movable in one of said compartments and defining a compression chamber therein; valves providing communication between the compression chamber and the other compartment and the valves having fluid passages of different width, ducts providing restricted communication between the compression chamber and said other compartment; and electrical means for rendering the valves inoperative.

11. In a shock absorber, the combination of a sealed housing providing compartments therein and containing fluid; a double acting piston movable in one of said compartments and defining two compression chambers therein; two one-way valves providing communication between the compression chambers and the other compartment, one of said valves permitting fluid flow into said other compartment and the other valve permitting fluid flow from said other compartment; and individual electrical means for rendering each valve inoperative at random.

12. In a shock absorber, the combination of a sealed housing providing compartments therein and containing fluid; a piston movable in one of said compartments and defining a compression chamber therein; a plurality of one-way valves providing communication between the compression chamber and the other compartment and the valves having fluid passages of different width, a duct providing restricted communication between the compression chamber and the other compartment; and individual electrical means for rendering each valve inoperative at random.

13. In a shock absorber, the combination of a sealed housing containing fluid; an iron partition in said housing providing compartments therein; a piston for causing fluid flow from one compartment to the other compartment; a valve in the partition; and electrical means for rendering the valve inoperative, said means including a coil in the partition whereby the partition material serves as an electromagnetic core.

HENRY OTTEN FUCHS.